May 31, 1966 D. J. CAMPBELL 3,254,336
SOUND SIMULATION SYSTEM
Filed March 13, 1963
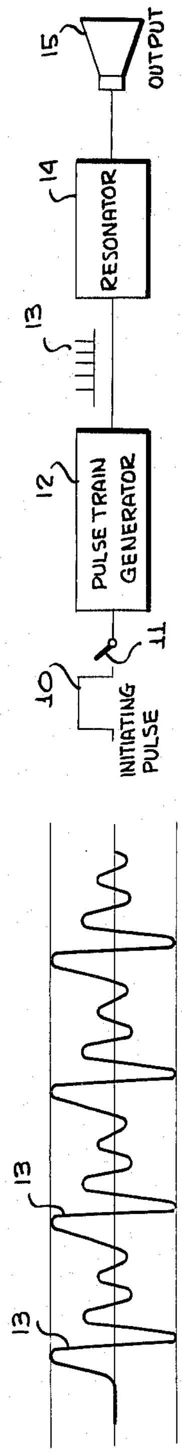
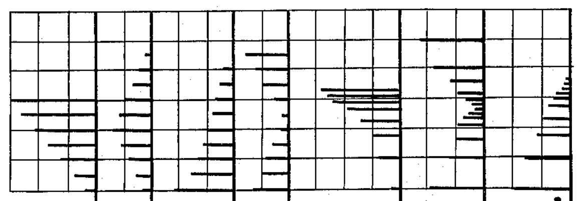
INVENTOR
DONALD J. CAMPBELL
BY William H. Breunig, Agent
Hurvitz & Rose
ATTORNEYS United States Patent Office 3,254,336 Patented May 31, 1966

3,254,336
SOUND SIMULATION SYSTEM

Donald J. Campbell, Cincinnati, Ohio, assignor to D. H. Baldwin Company, a corporation of Ohio Filed Mar. 13, 1963, Ser. No. 264,923
7 Claims. (Cl. 340—384)

The present invention relates generally to music systems, and more particularly to tone generators which generate tones simulating sounds which may occur in nature.

In certain advanced types of music, and for special effects in conventional music, it may be desirable to simulate the chirp of birds or insects, animal calls, or the sound of squeaks or scrapes, or even to provide completely novel types of sounds. Such sounds may be generated by means of pulse trains applied to shock excite resonant circuits. Such sounds generally have wave shapes corresponding with trains of sequentially occurring decaying sinusoidal waves. The repetition rate of the decaying sinusoids may be set in terms of a pulse train, i.e. each pulse of a pulse train may initiate a decaying sinusoidal wave. The decaying sinusoids may be generated by causing each pulse to shock excite a resonator. Resonators employed in the practice of the invention may be active or passive, signal frequency or multiple frequency, fixed frequency or variable frequency, high Q or low Q, as a function of the type of sound it is desired to simulate. For certain of these sounds the pulses within a train may have a constant repetition rate, but a non-uniform amplitude envelope. For other sounds the pulses within a train may have constant amplitudes, but may vary in frequency or repetition rate. More complex sounds may be generated by suitably varying both the amplitude and the frequency envelope within each pulse train.

Sounds occurring in nature have a random character. To include randomness in the synthetic tones of the present invention, random noise is added to the pulses of the pulse train. The random noise may be caused to vary the pulse amplitude envelope in a random fashion, or to vary the pulse frequency in a random fashion, or both. Randomness may be introduced into amplitude or frequency envelopes while maintaining the average value of the amplitude and/or frequency, for each position in each train, for a series of trains. Thereby, each succeeding train will be different from the preceding train but will conform well to an average train, representative of a type of sound, in both frequency (repetition rate) and amplitude envelopes.

It is, accordingy, a primary object of the invention to provide a system for simulating certain sounds occurring in nature.

It is another object of the invention to provide a system of sound generation, the sounds simulating natural sounds having repetitive damped sinusoidal wave shapes.

Another object of the invention resides in the provision of repetitive damped sinusoids having random character superposed on a constant average character, where the term character may imply repetition rate of damped sinusoids, or peak amplitude of damped sinusoids, or frequency of sinusoidal variation, or rate of damping, or any other characteristic, of sounds of naturally occurring types.

A further object of the invention resides in the provision of a wave train generator, wherein the wave train is composed of damped components occurring repetitively, and wherein one or more characteristics of the train or the components thereof, as a function of time, may be selected at will, or varied.

The above and still further objects, features and advantages of the present invention will become apparent upon consideration of the following detailed description of one specific embodiment thereof, especially when taken in conjunction with the accompanying drawings, wherein:

FIGURE 1 is a wave shape, plotted as amplitude versus time, of a typical sound occurring in nature;

FIGURE 2 is a block diagram of a system for generating the wave shape of FIGURE 1;

FIGURES 3–6, inclusive, are plots of pulse trains which may be provided in the system of FIGURE 2;

FIGURE 7 is a circuit diagram of a system according to the invention, partly schematic and partly in block; and FIGURES 8–14 are plots of amplitude versus frequency for various typical pulse trains, useful in the practice of the invention.

Referring now to the drawings, FIGURE 1 illustrates a train of damped sine waves, which is typical of wave shapes corresponding with sounds occurring in nature, such as squeaks and scrapes, chirps, insect and bird sounds, animal calls. Essentially, the wave shape of FIGURE 1 contains wave components having common peak amplitudes, and the repetition rate of the components is constant. Such wave trains can be generated by applying sequential pulses 10 from a source 11 to a pulse train generator 12, the latter being arranged to generate short pulses 13 at a predetermined rate while the pulses 10 are on. The pulses 13 each shock excite a relatively high Q resonator 14, which in turn supplies damped wave trains (FIGURE 1) to an output device 15, such as a speaker.

Natural sounds are not as regular, in various respects, as the wave form of FIGURE 1. For example, within a wave train, successive wave components may be of successively increasing amplitudes, without change in frequency of wave component repetition. Such wave shapes can be generated by pulse trains 13*a*, FIGURE 3. Alternatively, the amplitude of wave components may be greatest at initial and terminating positions within a train, and smaller at intermediate positions, as in FIGURE 4. Still further, as in FIGURES 5 and 6, frequency modulation of the wave train may be resorted to. A wide variety of sound effects is available, by controlling the character of the pulse train deriving from the pulse train generator 12, in respect to amplitude, or frequency, or both.

Referring now more particularly to FIGURE 7, pulses 20 are repetitive equally spaced pulses deriving from a source (not shown) and applied to an input terminal 21. Triode 22 is an amplifier of the pulses 20, and applies same at its anode to the anode 23 of a diode 24. Diode 24 includes in its cathode circuit a large capacitor 25 and a large parallel resistance 26, the latter including a potentiometer portion 27, having two independent sliders 28 and 29. The diode 24 provides a charge to capacitor 25, in response to each one of input pulses 20. The charge dissipates in resistance 26, giving rise to generally sawtooth wave forms 30 at sliders 28, 29, the amplitudes of which are functions of the settings of the sliders. The duration of the wave forms 30 are greater than the wave forms 20, in general, and may be sufficiently long to define a wave train, at the output of the system of the invention.

The wave shape 30 is applied to the grid 31 of a triode 32. The triode 32 is loaded at its anode 33 by a relatively large load resistance 34, and at its cathode 35 by a relatively small unbypassed bias resistance 36. Triode 37, including anode 38, cathode 39 and grid 40 are coupled to triode 32 in a Schmitt oscillator configuration, i.e. cathodes 35 and 39 are connected directly together, and anode 33 to grid 40 via capacitor 41. Triode 37 is anode loaded by resistance 43. A relatively large resistance 42 is connected between a positive terminal 44 and grid 40. Resistance 42 and capacitor 41 form a timing circuit.

The normal condition of the circuit is, with high positive potential at grid 40, deriving from positive terminal 44, that triode 37 is highly conductive. The positive potential at cathode 35 then maintains triode 32 cut-off, since triode 32 has no source of normally present positive grid voltage.

The flow of current through cathode resistance 36, from triode 37, is normally sufficient to maintain triode 32 at cut-off at least until wave shape 30 arrives at grid 31. When wave form 30 arrives at or exists on grid 31, at sufficient amplitude, it biases triode 32 into conduction. As triode 32 becomes conductive the potential of anode 33 decreases and a negative voltage is transferred to grid 40, via capacitor 41, decreasing the positive voltage at cathodes 35 and 39. The effect is cumulative and rapid until triode 32 becomes fully conductive and triode 37 cuts off. This action produces the spikes in wave train 45. At this point in the description anode 33 is at a low potential and anode 38 at high potential.

However, as soon as triode 37 cuts off, its cathode 39 reduces in potential, which is equivalent to negatively increasing the bias on triode 32. That tube becomes less conductive and transfers higher positive potential from its anode 33 via capacitor 41 to grid 40, which increases current flow in triode 37. The effect is rapidly cumulative until triode 37 becomes fully conductive (representing the space between spikes 45) while triode 32 becomes fully non-conductive.

The time between spikes is established by the time constant RC of capacitor 41 and resistance 42, which establishes the time required for a change of potential to transfer from anode 33 to grid 40, whereas the time of a spike is not subject to this condition, since feedback from triode 37 to triode 32 is via the common cathode resistance 36. Accordingly, sharp short spikes occur, with relatively long intermediate spaces. The duration of any space is, however, also a function of the bias on triode 32, deriving from wave form 30, since it is this value which establishes the maximum voltage across the RC circuit composed of capacitor 41 and resistance 42, and hence the moment when triode 37 will switch to the non-conductive states.

The average or normal frequency envelope of spikes 45 is then a function of wave form 30, and of the setting of slider 28. To introduce a measure of random operation, a random noise source 48 is coupled via capacitor 49 to grid 31. The random noise voltage thus superposed on wave form 30 randomizes the bias on triode 32 and, as a result, randomizes the times of occurrence of the spikes 45, but the amplitude of the random noise relative to that of wave form 30 is such that the latter controls an average and the former is superadded as a small (5% to 20%) effect. The inclusion of random noise provides a closer simulation of natural sound effects than is possible otherwise, by assuring failure of duplication of successive wave trains.

The wave trains 45, appearing at anode 38, are transferred via high pass filter 50, and gain controllable amplifier 51 to a multiple frequency passive electrical resonator 52. Each spike of the wave trains 45 shock excites the resonator 52, which has a sufficiently high Q that it generates a decaying sinusoidal wave shape when shock excited. A variable resistance 54 shunts the resonator 52 to enable variation of its Q values. While a passive multiple frequency resonator is employed in the specific circuit illustrated in FIGURE 7, it will be clear that single resonators, active resonators, or electromechanical resonators may be employed at will.

The voltage appearing across resonator 52 drives a power amplifier 55, which in turn drives an acoustic transducer or other load device 56, which renders the wave shapes as audible signals.

The system as described to this point provides constant amplitude spikes 45 to the resonator 52. To simulate natural sounds, or to provide sounds not necessarily found in nature, it may be required to provide a shaped amplitude envelope. In accordance with the present invention, an adjustable portion of wave shape 30, at slider 29, and noise from source 48, are combined in gain control amplifier 60, which supplies control voltage to amplifier 51, when switch 61 is closed, via lead 62. Clearly, a source of gain control voltage wave may be supplied which is independent in respect to shape of the wave shape 30, and amplifier 60 may be capable of providing at will a 0° or 180° phase shift. Presence of noise in the gain control voltage wave, as in the case of the frequency control voltage wave, assures that succeeding wave trains of a series will be slightly different from each other, but that the average characteristics will remain constant from wave train to wave train.

In FIGURES 8–14, inclusive, are illustrated various types of wave trains, which might be generated by judicious selection of train shaping wave forms, at sliders 28 and 29. However, these types are by no means exhaustive, since the control signal input to triode 32 and the gain control signal at amplifier 51, may be sinusoidal, half wave rectified, full wave rectified, sawtooth, square wave, or the like, the specific wave shape being limited only by the imagination of the designer, and the wave shapes which determine amplitude envelope may be diverse from or the same as those which control frequency envelope.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, a source of successive groups of short direct current pulses, an electrical pulse responsive resonator, means for coupling said resonator to said source, said resonator having a Q value providing multiple cycle shock excited oscillatory reaction to each of said pulses, and an acoustic transducer coupled to said resonator.

2. In combination, a source of successive trains of short direct current pulses, an electrical pulse responsive resonator, means coupling said resonator to said source, said resonator being shock excited in response to each of said pulses and having a Q value providing multiple cycle oscillatory reaction to each of said pulses, means for imparting at least approximately the same predetermined envelope to each of said trains, and a noise source coupled to said last mentioned means for randomizing said envelope.

3. The combination according to claim 2 wherein said envelope is a varying frequency envelope.

4. The combination according to claim 2 wherein said envelope is a varying amplitude envelope.

5. The combination according to claim 2 wherein said envelope includes variable frequency and amplitude.

6. In combination, a source of a succession of pulse trains, said pulses being short direct current pulses, an electrical pulse responsive resonator coupled to said source, said resonator being shock excited in response to each of said pulses and operative to generate a decaying multiple cycle sinusoidal wave when shock excited, means for providing at will at least approximately a particular frequency variation of said pulses and a particular amplitude variation of said pulses within each of said pulse trains, and a loud speaker coupled to said resonator.

7. The combination according to claim 6 wherein is provided means for randomizing said variations within each of said pulse trains and as between successive pulse trains.

(References on following page)

References Cited by the Examiner

UNITED STATES PATENTS

| | | | |
|---|---|---|---|
| 1,905,996 | 4/1933 | Couplex et al. | 84—1 |
| 1,994,902 | 3/1935 | Trouant | 340—384 |
| 2,434,920 | 1/1948 | Grieg | 331—166 X |
| 2,455,472 | 12/1948 | Curl et al. | 340—384 |
| 2,694,954 | 11/1954 | Kock | 331—78 X |
| 2,898,587 | 8/1959 | Nye | 340—384 |
| 2,989,886 | 6/1961 | Markowitz | 331—78 X |

NEIL C. READ, *Primary Examiner.*

I. J. LEVIN, WALTER C. GLEICHMAN, *Assistant Examiners.*